3,227,616
EMULSIONS OF CACTUS PLANT EXTRACT
Gilbert C. Van Wessem and Gering Mylius, Memmingen, and Heinz-Gunter Hahn, Leverkusen, Germany, assignors to Warner-Lambert Pharmaceutical Company, Morris Plains, N.J., a corporation of Delaware
No Drawing. Filed July 17, 1962, Ser. No. 210,596
2 Claims. (Cl. 167—91)

This application is a continuation-in-part of our co-pending application Serial No. 121,328, filed on July 3, 1961, now abandoned.

The use of various saccharides as a component of cosmetic preparations has long been known and one of the most ancient references to such preparations may be found in Egyptian documents which mention honey as a cosmetic ingredient. More recently, sugars such as dextrose, arabinose, xylose and similar saccharides have been suggested as being useful in cosmetic preparations. The value of these components appears to lie in the skin stimulation they effect by reason of the substantial osmotic pressure which they exert. The absorption of dextrose through the skin has been documented and the beneficial effects obtained are found to result without causing any skin irritation whatever.

Many plants are a source of these saccharide materials for use in cosmetic preparations and one of the raw materials from which these saccharides may be obtained for use in such preparations is the cactus, *Opuntia vulgaris*. This plant contains a number of the more useful saccharides and its value lies particularly in that the several saccharides are present in such amounts relative to each other that the plant comprises a very desirable raw material for the production of valuable saccharide extracts for incorporation into cosmetic preparations.

It is, therefore, an important object of this invention to provide a new and improved extraction process for the preparation of saccharide extracts of the cactus, *Opuntia vulgaris* which permits a high yield of said saccharide materials to be obtained with a minimum of manipulative steps and with the use of available and low-cost solvents.

Other objects of this invention will appear from the following detailed description.

We have found that the saccharide materials in cactus, *Opuntia vulgaris* may be readily extracted therefrom by a series of operations in which the raw material is diced, then treated with water a plurality of times to form an aqueous extract, the particles remaining comminuted in the presence of water, and the aqueous phase then separated, filtered and dried. More particularly, the aqueous treatment and extraction is preferably effected with the water at a temperature of 10 to 35° C., the diced raw material being subject to the action of the water for from 4 to 12 or more hours. Drying of the aqueous extracts should be carried out at a temperature of 45° C. as a maximum in order to avoid any thermal decomposition of the extract. The extract is then stored in sealed containers until used.

In order further to illustrate this invention the following examples are given:

*Example I*

10 parts by weight of peeled and diced cactus, *Opuntia vulgaris* in which the dimensions of the particles are about 0.5 x 0.5 x 2 cm. are covered with about a 20% excess by weight of water at 20° C. and allowed to stand for 5 hours. The aqueous extract formed is separated and the diced particles are covered with about 75% by weight of water at 20° C. and again allowed to stand for about 12 hours. The aqueous extract formed is then separated, water is added to the diced particles remaining in an amount of about 75% by weight of the particles, the mixture passed through a mincing machine and the aqueous slurry of vegetable matter allowed to stand at 20° C. for at least 5 hours. The glutinous surface layer is decanted and the vegetable matter in the remainder is separated mechanically from the aqueous phase. The several aqueous phases and aqueous extracts are all filtered thoroughly and dried at 45° C. under air circulation. The dried extract which contains, among others, mannose, l-arabanose as arabane and d-galactose as galactone is then stored in sealed containers.

The dried extract gives excellent results when incorporated in cosmetic products such as the usual mineral oil base skin cleansing creams which contain stearic acid, lanolin and emulsifying agents, as well as in the water-in-oil emulsions formulated for use as night creams and in the oil-in-water emulsions used as moisturizing creams.

Typical of such cosmetic compositions are the following:

*Example II*

The following ingredients are combined in the proportions indicated to form a homogeneous composition comprising a water-in-oil emulsion:

| Ingredient: | Percent by weight |
|---|---|
| Isopropyl myristate | 7.50 |
| Stearic acid, USP | 1.60 |
| Propyl paraben, USP (propyl para-hydroxybenzoate) | 0.08 |
| Methyl paraben, USP (methyl para-hydroxybenzoate) | 0.12 |
| Glycerin, USP | 4.00 |
| Anhydrous lanolin | 2.25 |
| Triethanolamine | 1.00 |
| Mineral oil | 15.00 |
| Perfume | 0.30 |
| Glycerol monostearate | 1.60 |
| Opuntia dry extract | 0.015 |
| Water, q.s. to 100.00. | |

*Example III*

A typical night cream is obtained by homogeneously combining the following ingredients in the proportions indicated to form a water-in-oil emulsion:

| Ingredient: | Percent by weight |
|---|---|
| Beeswax | 8.00 |
| White oil | 40.00 |
| Propyl paraben (propyl para-hydroxybenzoate) | 0.10 |
| Methyl paraben (methyl para-hydroxybenzoate) | 0.10 |
| Zinc stearate | 1.00 |
| Sodium borate | 0.30 |
| Perfume | 0.75 |
| Glycerine | 1.00 |
| Cactus extract (2% solids) | 2.50 |
| Distilled water, q.s. to 100.00. | |

Example IV

An emollient lotion is prepared by combining the following ingredients in the proportions indicated to form an oil-in-water emulsion:

| Ingredient: | Percent by weight |
|---|---|
| Glyceryl monostearate | 1.00 |
| Stearic acid | 3.50 |
| Lanolin | 5.00 |
| Heavy mineral oil | 15.00 |
| Glycerine | 8.00 |
| F.D.C. Yellow #5 (0.5% sol.) | 0.75 |
| F.D.C. Yellow #6 (0.5% sol.) | 0.15 |
| Methyl paraben (methyl para-hydroxybenzoate) | 0.15 |
| Perfume | 0.50 |
| Cactus extract (2% dispersion in water) | 2.50 |
| Triethanol amine | 1.00 |
| Water distilled, q.s. to 100.00. | |

It is understood that the foregoing detailed description is given merely by way of illustration and that many variations may be made therein without departing from the spirit of our invention.

Having described our invention, what we desire to secure by Letters Patent is:

1. A stable and homogeneous water-in-oil cosmetic emulsion which consists essentially of:

| Components: | Percent by weight |
|---|---|
| Beeswax | 8.00 |
| White oil | 40.00 |
| Propyl para-hydroxybenzoate | 0.10 |
| Methyl para-hydroxybenzoate | 0.10 |
| Zinc stearate | 1.00 |
| Sodium borate | 0.30 |
| Perfume | 0.75 |
| Glycerine | 1.00 |
| *Opuntia vulgaris* plant extract (2% solids) | 2.50 |
| Distilled water, q.s. to 100.00. | |

2. A stable and homogeneous oil-in-water cosmetic emulsion which consists essentially of:

| Components: | Percent by weight |
|---|---|
| Glyceryl monostearate | 1.00 |
| Stearic acid | 3.50 |
| Lanolin | 5.00 |
| Mineral oil (heavy) | 15.00 |
| Glycerine | 8.00 |
| Coloring | .90 |
| Methyl para-hydroxybenzoate | .15 |
| Perfume | .50 |
| *Opuntia vulgaris* cactus plant extract (2% solids) | 2.50 |
| Triethanol amine | 1.00 |
| Water distilled, q.s. to 100.00. | |

References Cited by the Examiner

UNITED STATES PATENTS

| | | | |
|---|---|---|---|
| 1,888,601 | 11/1932 | Mack et al. | 167—91 |
| 2,073,616 | 3/1937 | Acree | 260—209 |
| 2,085,693 | 6/1937 | Byrne | 167—91 |
| 2,294,229 | 8/1942 | Fiero | 167—91 |
| 2,617,754 | 11/1952 | Neely | 167—91 |
| 2,832,765 | 4/1958 | Roberts et al. | 260—209 |
| 2,845,363 | 7/1958 | Gutzeit | 167—90 |

OTHER REFERENCES

Chemical Abstracts, vol. 51: 8274 (1957).

Drug and Cosmetic Industry, vol. 41, No. 1, July 1937, p. 117.

Sagarin: Cosmetics—Science and Technology, Interscience Publishers, New York (1957), pp. 99, 101, 102, 105, 108, 109, 114–117, 119, 129–130 and 134–137.

JULIAN S. LEVITT, *Primary Examiner.*

CHARLES B. PARKER, *Examiner.*